United States Patent
Jelinek et al.

(10) Patent No.: US 8,112,749 B2
(45) Date of Patent: Feb. 7, 2012

(54) DYNAMIC, TEMPORARY RESOURCE POOLS FOR USE IN VIRTUALIZATION

(75) Inventors: Gerald A. Jelinek, Colorado Springs, CO (US); Daniel B. Price, Menlo Park, CA (US); David S. Comay, San Ramon, CA (US); Stephen Frances Lawrence, Newark, CA (US)

(73) Assignee: Oracle America, Inc., Redwood City, CA (US)

( * ) Notice: Subject to any disclaimer, the term of this patent is extended or adjusted under 35 U.S.C. 154(b) by 1267 days.

(21) Appl. No.: 11/765,128

(22) Filed: Jun. 19, 2007

(65) Prior Publication Data
US 2008/0320474 A1    Dec. 25, 2008

(51) Int. Cl.
*G06F 9/455* (2006.01)
*G06F 9/46* (2006.01)

(52) U.S. Cl. ............................ 718/1; 718/104
(58) Field of Classification Search ........................ 718/1
See application file for complete search history.

(56) References Cited

U.S. PATENT DOCUMENTS
2002/0016892 A1* 2/2002 Zalewski et al. ............... 711/153
2008/0320474 A1* 12/2008 Jelinek et al. ....................... 718/1

OTHER PUBLICATIONS

Joost Pronk van Hoogeveen and Paul Steeves, Solaris Software, "Solaris 10 How To Guides: Consolidating Servers and Applications with Solaris Containers," 2005, Sun Microsystems, Inc., Santa Clara, California.
"System Administration Guide: Solaris Containers-Resource Management and Solaris Zones," Part No. 817-1592, 2006, Sun Microsystems, Inc., Santa Clara, California.

* cited by examiner

*Primary Examiner* — Kenneth Tang
(74) *Attorney, Agent, or Firm* — Brooks Kushman P.C.

(57) ABSTRACT

A method of implementing virtualization involves dynamic, temporary resource pools. A virtualizing subsystem is capable of partitioning a plurality of physical resources to create resource pools. The virtualizing subsystem is further capable of creating separate environments that logically isolate applications from each other, and assigning a created separate environment to a created resource pool. A separate environment is configured by defining properties of the separate environment. Configuring the separate environment includes specifying at least one resource pool attribute. When the separate environment is started, a temporary resource pool is created from available physical resources and the separate environment is assigned to the temporary resource pool. The temporary resource pool is created in accordance with the at least one resource pool attribute specified when the separate environment was configured. The temporary resource pool may be destroyed when the separate environment is shutdown.

16 Claims, 6 Drawing Sheets

FIG. 10

DYNAMIC, TEMPORARY RESOURCE POOLS FOR USE IN VIRTUALIZATION

BACKGROUND OF THE INVENTION

1. Field of the Invention

The invention relates to virtualization techniques and to resource management.

2. Background Art

The use of virtualization is increasing. In general, virtualization relates to creating an abstraction layer between software applications and physical resources. There are many approaches to virtualization.

One existing operating system virtualization technique is SOLARIS Containers, available in the SOLARIS operating system from Sun Microsystems, Inc., Santa Clara, Calif. SOLARIS Containers includes several different technologies that are used together to consolidate servers and applications. With server virtualization, applications can be consolidated onto a fewer number of servers. For example, multiple virtual servers may exist on a single physical server.

The SOLARIS Containers approach to implementing virtualization involves a technology referred to as SOLARIS zones and a technology referred to as SOLARIS resource pools. Zones are separate environments on a machine that logically isolate applications from each other. Each application receives a dedicated namespace. Put another way, a zone is a type of sandbox. A resource pool is a set of physical resources such as, for example, processors. The SOLARIS pools facility is used to partition the system resources into a plurality of resource pools for the purposes of resource management. The SOLARIS zones facility is for virtualizing the operating system to improve security, provide isolation and administrative delegation.

When consolidating applications with SOLARIS Containers, physical resources are partitioned into a number of resource pools. A zone may be created for each application, and then one or more zones are assigned to each resource pool.

Another technology involved in SOLARIS Containers is called the Fair Share Scheduler (FSS). The Fair Share Scheduler is used when multiple zones are assigned to the same resource pool. The scheduler software enables resources in a resource pool to be allocated proportionally to applications, that is, to the zones that share the same resource pool.

In an existing implementation of SOLARIS Containers, the pools facility is static. That is, the pool configurations must be defined in advance. However, SOLARIS zones are dynamic. There can be many zones defined; the zones may not all be running at a particular time. Zones can be rebooted or even moved to a new host.

In the SOLARIS Containers approach to virtualization, zones and resource pools provide application containment. Within an application container, the application believes that it is running on its own server; however, the kernel and a number of system libraries are shared between the various containers. As well, the physical resources are shared in accordance with the configured resource pools.

Figure 1:
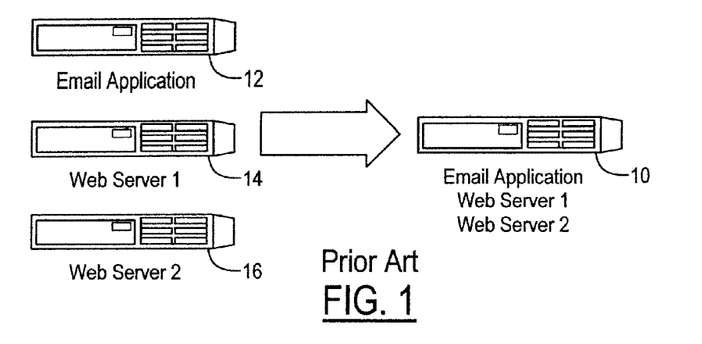
FIG. 1-3 illustrate an example of server virtualization in an existing implementation of SOLARIS Containers.
Figure 2:
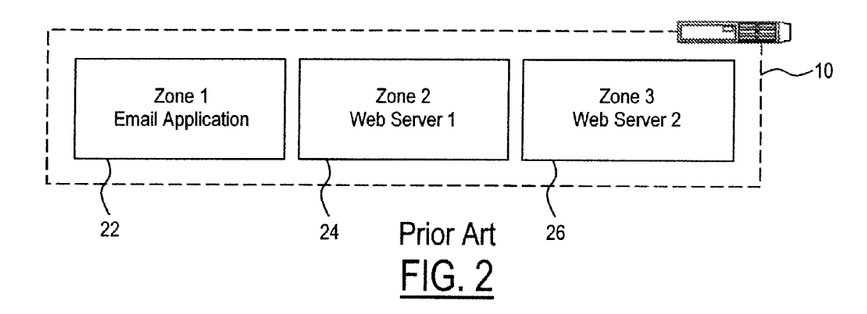
Figure 3:
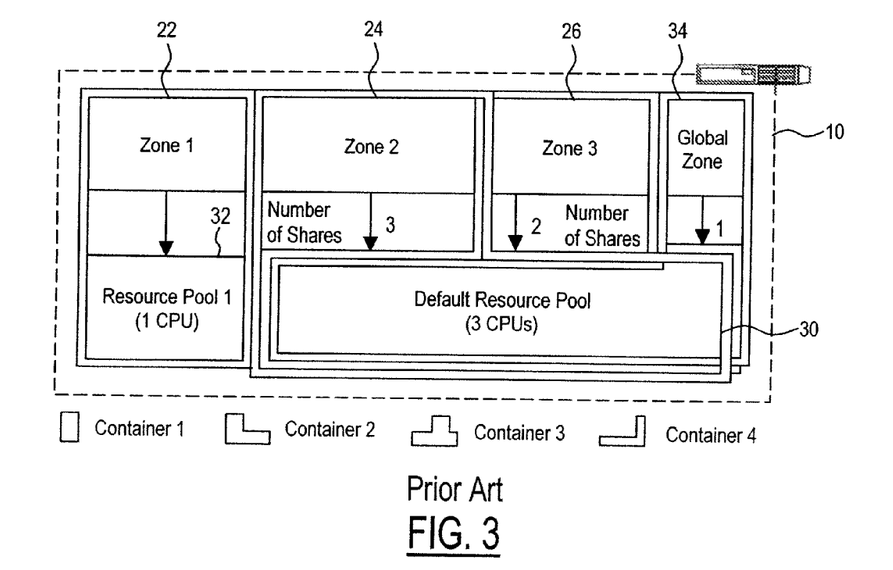

FIGS. 1-3 illustrate an existing implementation of SOLARIS Containers, showing how virtualization allows multiple applications and servers to be consolidated onto a single physical server using application containers composed of zones and resource pools. As shown in FIG. 1, a single physical server 10, using server virtualization, allows the consolidation of an email application 12, a first web server 14, and a second web server 16. The single physical server 10 includes multiple virtual servers such that, after consolidation, each of the email application, first web server, and second web server exists on its own virtual server on server 10.

As best shown in FIG. 2, in order to create the application containers, each application has its own zone 22, 24, and 26. FIG. 3 illustrates the completed example including first and second resource pools 30 and 32, respectively. Zones 22, 24, and 26 are non-global zones; the global zone is indicated at 34. Global zone 34 is the original SOLARIS operating system instance.

With continuing reference to FIG. 3, zone 22 has a dedicated resource pool, pool 32. Zone 24, zone 26, and the global zone 34 share resource pool 30. The Fair Share Scheduler (FSS) proportionally allocates resources to zone 24, zone 26, and global zone 34 in accordance with assigned numbers of shares.

As shown, there are four application containers. The first container is composed of zone 22 and resource pool 32. The second container is composed of zone 24 and resource pool 30. The third container is composed of zone 26 and resource pool 30. The fourth container is composed of global zone 34 and resource pool 30.

Due to certain aspects of this existing implementation of virtualization, it can be difficult to combine the static nature of pools with the dynamic nature of zones in a flexible way. In particular, some users may have difficulty setting up a good resource management configuration to accompany their zone configuration.

Background information relating to SOLARIS Containers technology may be found in Joost Pronk van Hoogeveen and Paul Steeves, Solaris Software, "SOLARIS 10 How To Guides: Consolidating Servers and Applications with SOLARIS Containers," 2005, Sun Microsystems, Inc., Santa Clara, Calif.

Further background information may be found in "System Administration Guide: Solaris Containers-Resource Management and Solaris Zones," Part No.: 817-1592, 2006, Sun Microsystems, Inc., Santa Clara, Calif.

Another existing approach to virtualization involves what are referred to as virtual machines. In this approach to virtualization, software running on the host operating system (or in some cases below the host operating system) allows one or more guest operating systems to run on top of the same physical hardware at the same time. In this approach, the guest operating system is a full operating system, including the kernel and libraries.

In any approach to implementing virtualization, existing approaches to resource management can limit flexibility. With the increasing use of virtualization, there is a desire to provide increased flexibility in resource management.

SUMMARY OF INVENTION

It is an object of the invention to provide dynamic, temporary resource pools for use in virtualization.

In accordance with the invention, dynamic, temporary resource pools are configured and maintained by a virtualizing subsystem.

In an operating system virtualization technique wherein the virtualizing subsystem creates separate environments on a machine that logically isolate applications from each other, when a created separate environment such as a virtual operating system starts up, a temporary resource pool is created for the separated environment. When this separate environment is shutdown, the temporary resource pool may be destroyed. In this way, the created resource pool is dynamic in that the pool is created when the virtual operating system is booted and removed when the virtual operating system shuts down. Put another way, the temporary, dynamic resource pool need only exist in the dynamic state of the system, and may coexist with any persistent resource pools.

For example, in an approach to implementing virtualization involving zones and resource pools such as SOLARIS Containers, the dynamic, temporary resource pools can be configured and maintained by the zones subsystem. When a zone boots, the pool configuration for the zone is created. When the zone shuts down or the system is rebooted, the temporary pool no longer exists. In this way, the created resource pool is dynamic in that the pool is created when the zone is booted, and is temporary in that the pool is destroyed when the zone shuts down.

Further, embodiments of the invention may also be implemented in other virtualization techniques. For example, in a virtualization technique involving virtual machines, the virtualizing subsystem creates separate environments on a machine that logically isolate the virtual machines from each other. When a virtual machine starts up, a temporary resource pool is created for the virtual machine. When the virtual machine is shut down, the temporary resource pool may be destroyed. In this way, the created resource pool is dynamic in that the pool is created when the virtual machine is booted and removed when the virtual machine shuts down.

There are many advantages associated with embodiments of the invention. For example, resource pools may be managed in a dynamic fashion by a virtualization subsystem without interfering with any existing or new persistent pool configuration operations. In addition, the use of dynamic, temporary resource pools simplifies resource pool configuration and management. In a preferred implementation, pool configuration may migrate with the zone (or other type of separated environment) from host to host. Further, it is to be appreciated that virtual operating systems and virtual machines are merely examples of virtualization implementations that may be implemented with dynamic, temporary resource pools in accordance with the invention. For example, other sandbox type environments may run on a dynamic, temporary resource pool that is created for the sandbox when the sandbox starts or initializes, and that is subsequently removed when the sandbox is shut down or terminated.

DETAILED DESCRIPTION OF THE PREFERRED EMBODIMENT

The preferred embodiment of the invention enhances SOLARIS Containers in the SOLARIS operating system. In more detail, some basic resource pool configuration is integrated with zones, and dynamic, temporary resource pools are provided. Of course, it is to be appreciated that enhancing SOLARIS Containers is one embodiment of the invention; dynamic, temporary resource pools may be used in other virtualization implementations such as implementations involving virtual machines or any other sandbox-like environments. A central concept is that dynamic resource pools are utilized such that the virtual operating system, virtual machine, or other virtual environment runs on a dynamic resource pool that is linked to the virtual operating system, virtual machine, sandbox, etc. upon startup of the virtual environment.

Figure 4:
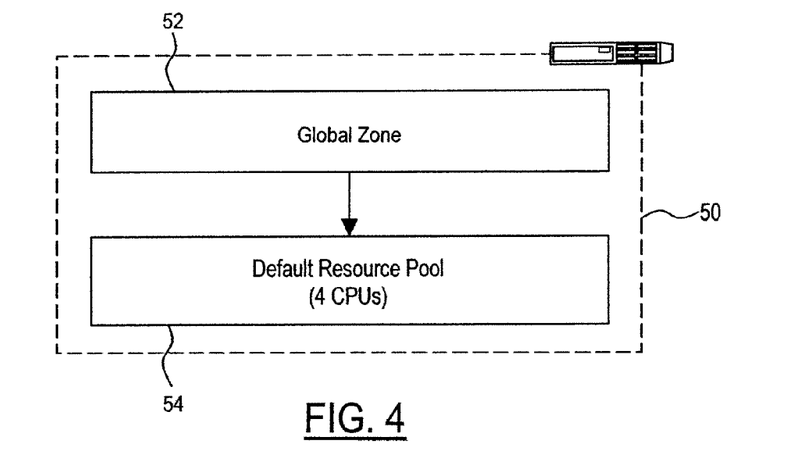
FIG. 4 illustrates a system, in the preferred embodiment of the invention, prior to any configuration.

FIGS. 4-10 illustrate a step-by-step example of server and application consolidation in the preferred embodiment of the invention, which is implemented as an enhancement to SOLARIS Containers in the SOLARIS operating system. FIG. 4 illustrates a system 50 prior to any configuration. System 50 initially has only the global zone 52 as non-global zones have not yet been configured. System 50 includes a single, default resource pool 54 consisting of four processors.

Figure 5:
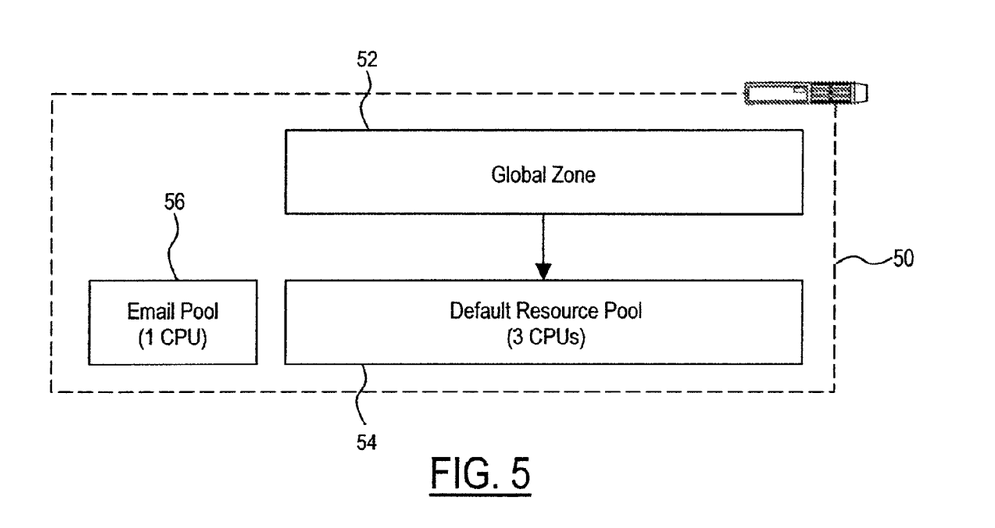
FIG. 5 illustrates the system after the creation of a resource pool for an email application.

FIG. 5 illustrates the system 50 with a resource pool 56 created with the SOLARIS pools facility. Resource pool 56 is composed of a single processor that has been removed from the default resource pool 54 and allocated to resource pool 56. Resource pool 56 is being created to provide dedicated resources for an email application. In more detail, a resource pool is a logical entity that owns a subset of the system resources. These subsets are known as resource sets. In this example, the resource set is a processor set. In order to create resource pool 56, a processor set is defined, in this case, as including a single processor. Resource pool 56 is then created and the processor set including the single processor is added to resource pool 56, resulting in the configuration shown in FIG. 5. This process for creating a resource pool may take place in a known fashion as provided by the pools facility in the SOLARIS operating system, as understood by one of ordinary skill in the art.

Figure 6:
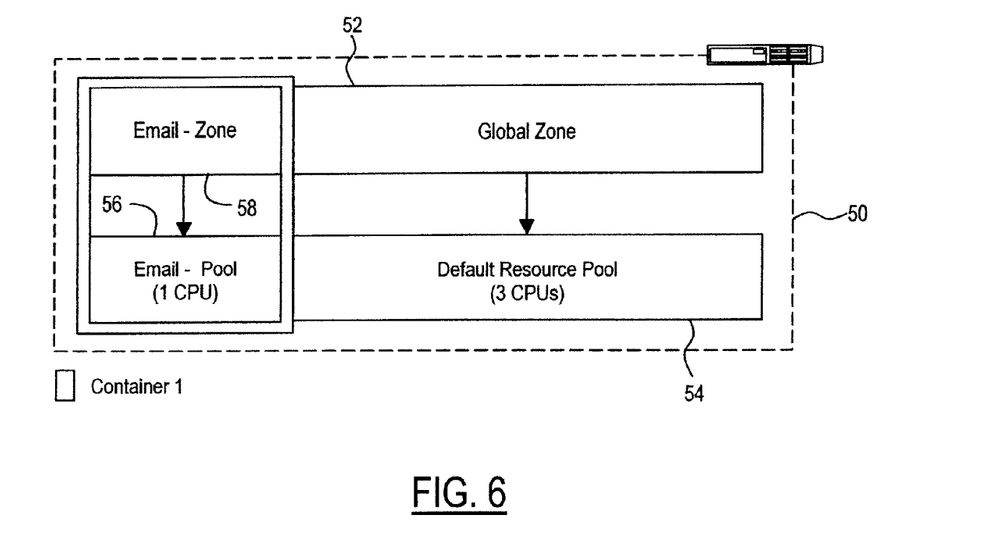
FIG. 6 illustrates the system after the configuration, installation, and booting of a zone for the email application.

FIG. 6 illustrates the system 50 after the next step, with a zone 58 for the email application having been configured, installed, and booted. The zone 58 and the resource pool 56 for the email application compose a container for the email application. In more detail, the zone 58 is a separate environment on the system 50 that logically isolates the email application from other applications outside of zone 58. Configuring a zone involves defining zone properties such as file systems and network interfaces, and involves designating a resource pool for the zone. In this case, the new zone 58 is assigned to resource pool 56. After the zone has been configured, installed, and is up and running, the result is the system 50 as shown in FIG. 6. The remaining three processors remain in the default resource pool 54 with the global zone 52. This process for creating a zone may take place in a known fashion as provided by the zones facility in the SOLARIS operating system, as understood by one of ordinary skill in the art.

Figure 7:
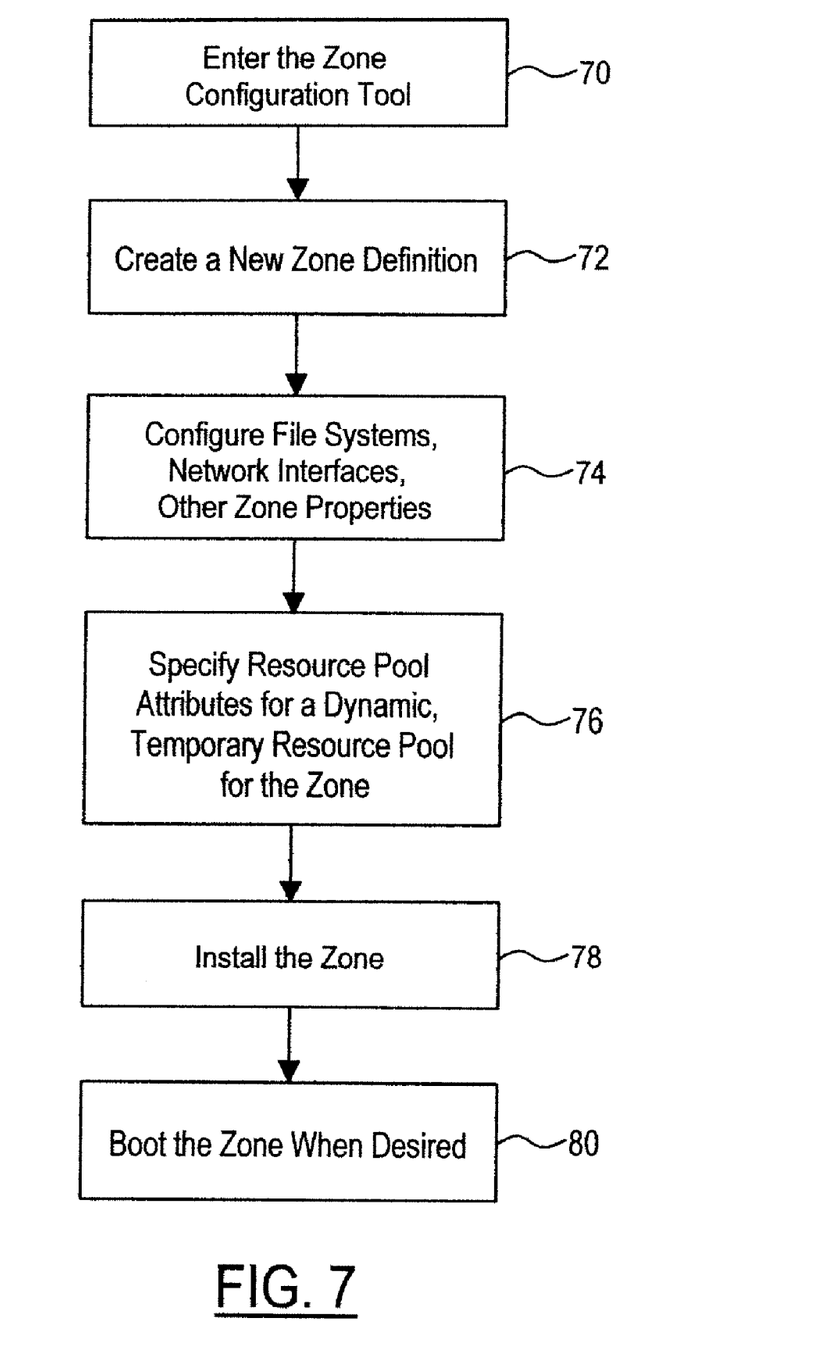
FIG. 7 illustrates the configuration and installation of a zone, wherein some basic resource pool configuration, in accordance with the preferred embodiment of the invention, is integrated with the zone.

In accordance with the preferred embodiment of the invention, the remainder of the default resource pool 54 may be used for dynamic, temporary pools. FIG. 7 illustrates the configuration and installation of a zone, wherein some basic resource pool configuration, in accordance with the preferred embodiment of the invention, is integrated with the zone. In order to configure a new zone, the zone configuration tool is entered at block 70. A new zone definition is created at block 72. The new zone is assigned to a file system, and network parameters are configured, at block 74. Other zone properties may also be configured at block 74. In accordance with the invention, configuring the new zone further includes specifying resource pool attributes for a dynamic, temporary resource pool for the new zone, as indicated at block 76. These resource pool attributes allow for some basic resource pool configuration to be integrated with the zone.

In the preferred embodiment, the resource pool attributes specified in the zone configuration may include a number of dedicated processors for the temporary resource pool (for example, two dedicated processors). In the alternative, a minimum and maximum number of dedicated processors may be specified (for example, 2-4 dedicated processors). The resource pool configuration integrated with the zone need not be limited to processors. For example, it is contemplated that an amount of dedicated memory could be specified (for example, 500 megabytes of dedicated memory); or, a minimum and maximum amount of dedicated memory could be specified (for example, 0.5-1.0 gigabytes of dedicated memory). In general, in order for the zone to use a dynamic, temporary resource pool, at least one resource pool attribute is specified for the zone. The possibilities for these resource pool attributes may vary depending on the underlying resource pools facility implementation.

Once the zone configuration is completed, the new zone is installed, as indicated at block 78. As indicated at block 80, the installed zone may be booted when desired.

Figure 8:
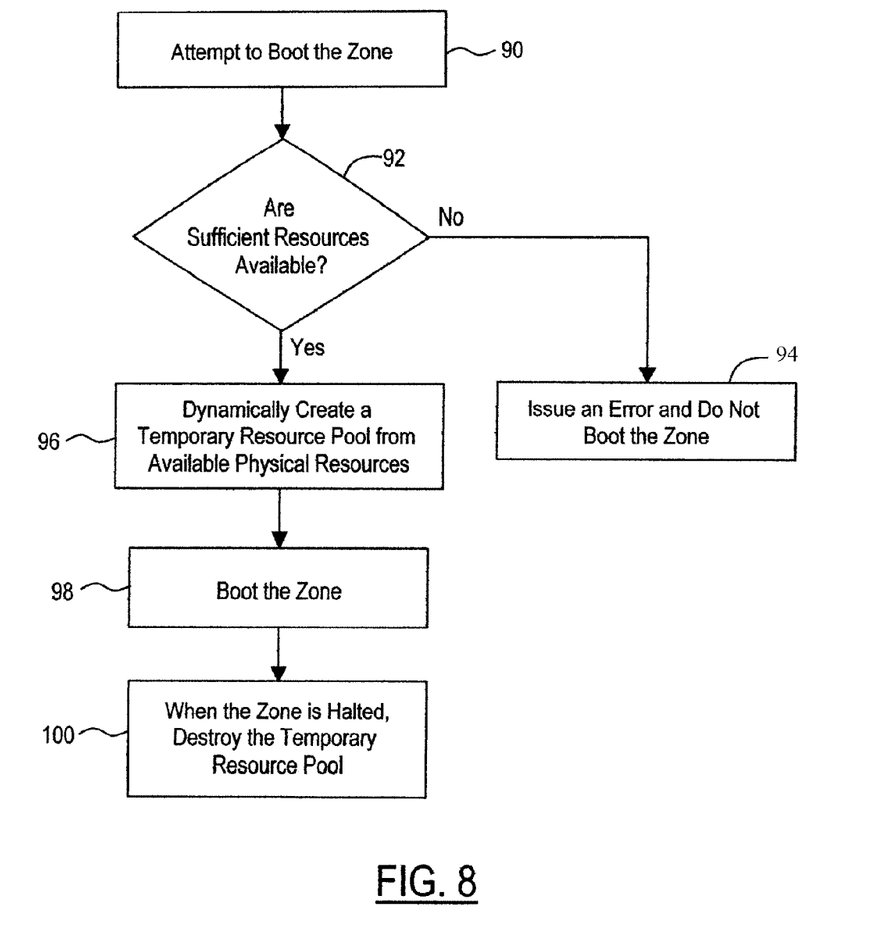
FIG. 8 illustrates the use of dynamic, temporary resource pools, in accordance with the preferred embodiment of the invention.

FIG. 8 illustrates the use of dynamic, temporary resource pools, in accordance with the preferred embodiment of the invention. At block 90, an attempt is made to boot an installed and configured zone of the type in which resource pool attributes for a temporary resource pool are specified. That is, prior to booting, the zone does not have a designated resource pool. At block 92, the zones subsystem checks to determine if the resources (for example, a specified number of dedicated processors) needed to create the temporary pool are available. In the event that the required physical resources are not available, an error is generated and the zone is not booted, as depicted at block 94. When sufficient resources are available, flow proceeds to block 96.

At block 96, a temporary resource pool is created for the zone. For example, if the zone configuration specified that two dedicated processors were required for the zone, the zones facility and pools facility cooperate to create a processor resource set including two processors, a resource pool is created, and the resource set including the two processors is added to the resource pool. In turn, the zone is assigned to the resource pool. At block 98, the zone is booted. When the zone is subsequently halted or shutdown, the temporary resource pool is destroyed, as indicated at block 100, and resources from the temporary resource pool are returned to the default resource pool for re-use.

It is appreciated that the preferred embodiment of the invention improves the integration of zones and pools by allowing configuration of some basic resource pool attributes within a zone configuration. Of course, using the pools facility directly could allow for more advanced pool configurations; however, the ability to configure some resource pool attributes in the zone configuration allows some basic pool configuration such as, for example, hard partitioning of processor resources, directly in the zone configuration.

Figure 9:
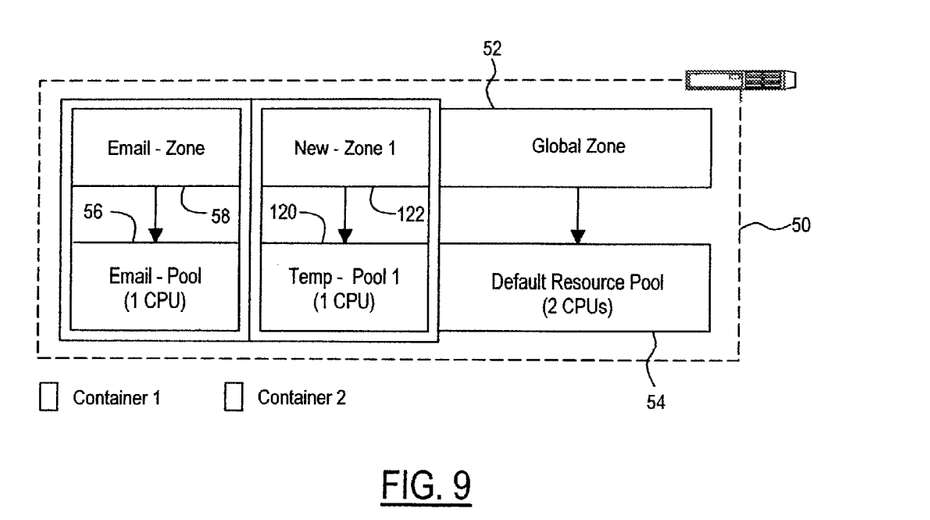
FIG. 9 illustrates the system after configuration, installation, and booting of a zone that uses a dynamic, temporary resource pool that is created, upon booting of the zone, using available resources from the default resource pool.

FIG. 9 illustrates the system 50 with zone 58 for the email application having been configured and installed, and assigned to resource pool 56 as illustrated in FIG. 6; however, FIG. 9 further illustrates a new zone 122 having been configured, installed and booted wherein the new zone 122 uses a temporary resource pool 120. Zone 122 is configured and installed according to the method shown in FIG. 7, and the configuration for zone 122 specifies resource pool attributes for the temporary pool that is created when the zone 122 is booted. In this case, the zone configuration specifies that the zone needs a single dedicated processor. Because there was a single processor available in the default resource pool 54 prior to booting zone 122, the temporary resource pool 120 was able to be created and zone 122 assigned thereto. When zone 122 is subsequently shutdown, temporary pool 120 may be destroyed.

Figure 10:
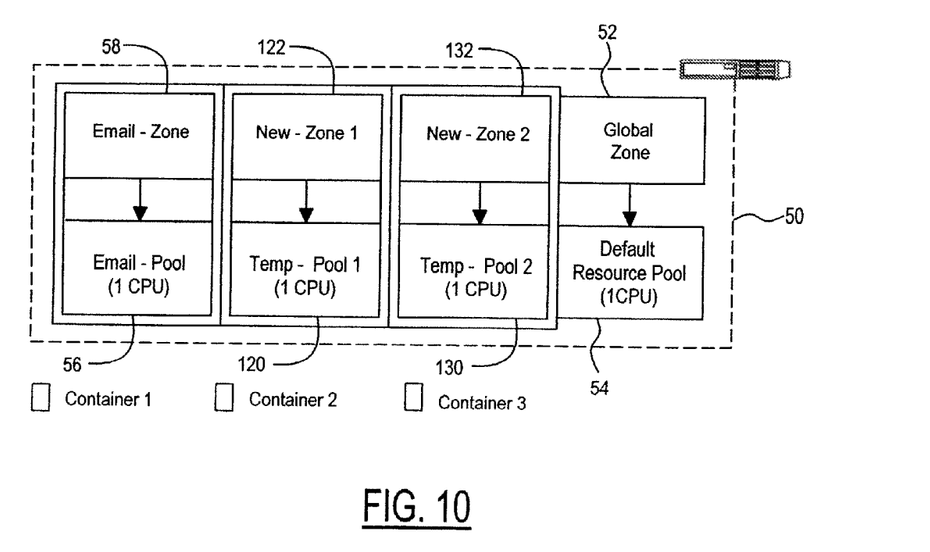
FIG. 10 illustrates the system after configuration, installation, and booting of an additional zone that uses an additional dynamic, temporary resource pool that is created, upon booting of the additional zone, using available resources from the default resource pool.

FIG. 10 illustrates the system 50 as illustrated in FIG. 9 with zone 122 assigned to temporary pool 120, and further illustrates an additional new zone 132 assigned to temporary resource pool 130. In this case, the zone configuration specifies that the zone needs a single dedicated processor. Because there was a single processor available in the default resource pool 54 prior to booting zone 132, the temporary resource pool 130 was able to be created and zone 132 assigned thereto. When zone 132 is subsequently shutdown, temporary pool 130 may be destroyed.

It is appreciated that a new temporary resource pool may be created from available resources in the default resource pool. Further, it is appreciated that temporary pool resources could also come from any resource sets which have greater than their minimum number of resources. For example, a resource set for a persistent pool, or a resource set for another temporary pool, could have greater than its minimum required resources and, in turn, could part with resources that would be used for the new temporary resource pool. Similarly, when a temporary resource pool is destroyed, resources could be returned to the default resource pool. It is also possible that, when a temporary resource pool is destroyed, the resources could go to any resource sets which have less than their maximum number of resources. For example, a resource set for a persistent pool, or a resource set for another temporary pool, could have less than its maximum required resources and, in turn, could receive resources made available by the destruction of a temporary resource pool.

It is appreciated that the above-described preferred embodiment of the invention enhances SOLARIS Containers in the SOLARIS operating system. The invention is also applicable to other virtualization implementations wherein a physical server (physical server includes traditional server computers, workstations, desktop computers, and any other computing platforms having a plurality of physical resources that are used to provide services) includes physical resources that are partitioned into resource pools by a virtualizing subsystem. Further, the resource pools are not limited to processors and memory, and other hardware resources may be partitioned into resource pools in embodiments of the invention. Further, the separate environments that logically isolate applications from each other, zones in the preferred embodiment, may take other forms and may implement other sandbox-like environments such as virtual machines and are not limited to virtual operating systems. Put another way, embodiments of the invention may be employed in a variety of platforms to provide dynamic, temporary resource pools for which attributes are specified in the configuration of the separated or virtual environment.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of implementing virtualization on a physical server, the physical server including a plurality of physical resources, a kernel, a plurality of libraries, and a virtualizing subsystem, the virtualizing subsystem being capable of partitioning the plurality of physical resources to create resource pools, the virtualizing subsystem being further capable of creating separate environments on the physical server that logically isolate applications from each other, and assigning created separate environments to created resource pools, the method comprising:
   configuring a separate environment by defining properties of the separate environment, configuring the separate environment including specifying at least one resource pool attribute, wherein the separate environment is a zone that logically isolates applications from each other to provide an application with a dedicated namespace, the zone being a virtual operating system that shares the kernel and the plurality of libraries; and
   when the separate environment is started, dynamically creating a temporary resource pool from available physical resources and assigning the separate environment to the temporary resource pool, the temporary resource pool being created in accordance with the at least one resource pool attribute specified when the separate environment was configured,
      wherein the at least one resource pool attribute indicates at least one of (i) an amount of dedicated memory for the resource pool, and (ii) a number of dedicated processors for the resource pool.

2. The method of claim 1 further comprising:
   when the separate environment is shutdown, destroying the temporary resource pool.

3. The method of claim 1 wherein dynamically creating the temporary resource pool further comprises:
   determining the availability of physical resources to meet the at least one resource pool attribute specified when the separate environment was configured; and
   if sufficient physical resources are available, creating the temporary resource pool.

4. The method of claim 1 wherein the at least one resource pool attribute indicates a number of dedicated processors for the resource pool.

5. The method of claim 4 wherein the at least one resource pool attribute indicates a minimum number of dedicated processors for the resource pool.

6. The method of claim 5 wherein the at least one resource pool attribute indicates a maximum number of dedicated processors for the resource pool.

7. The method of claim 1 wherein the at least one resource pool attribute indicates an amount of dedicated memory for the resource pool.

8. The method of claim 7 wherein the at least one resource pool attribute indicates a minimum amount of dedicated memory for the resource pool.

9. The method of claim 8 wherein the at least one resource pool attribute indicates a maximum amount of dedicated memory for the resource pool.

10. The method of claim 1 wherein starting the separate environment comprises booting the virtual operating system.

11. A method of implementing virtualization on a physical server, the physical server including a plurality of physical resources, a kernel, a plurality of libraries, and a virtualizing subsystem, the virtualizing subsystem being capable of partitioning the plurality of physical resources to create resource pools, the virtualizing subsystem being further capable of creating separate environments on the physical server that logically isolate applications from each other, and assigning created separate environments to created resource pools, the method comprising:
   configuring a plurality of separate environments by defining properties of each separate environment, configuring the plurality of separate environments including, for each separate environment, specifying at least one resource pool attribute, wherein each separate environment is a zone that logically isolates applications from each other to provide an application with a dedicated namespace, the zone being a virtual operating system that shares the kernel and the plurality of libraries; and
   when a particular separate environment is started, dynamically creating a temporary resource pool from available physical resources and assigning the particular separate environment to the temporary resource pool, the temporary resource pool being created in accordance with the at least one resource pool attribute specified when the particular separate environment was configured,
      wherein the at least one resource pool attribute indicates at least one of (i) an amount of dedicated memory for the resource pool, and (ii) a number of dedicated processors for the resource pool.

12. The method of claim 11 further comprising:
   when the particular separate environment is shutdown, destroying the temporary resource pool.

13. The method of claim 11 wherein dynamically creating the temporary resource pool further comprises:
   determining the availability of physical resources to meet the at least one resource pool attribute specified when the particular separate environment was configured; and
   if sufficient physical resources are available, creating the temporary resource pool.

14. The method of claim 11 wherein the at least one resource pool attribute indicates a number of dedicated processors for the resource pool.

15. The method of claim 11 wherein the at least one resource pool attribute indicates an amount of dedicated memory for the resource pool.

16. A computer-readable storage medium having information stored thereon for directing a computer to perform the method of claim 11.

* * * * *